July 5, 1932.  E. J. WELCH  1,865,660
FINISHING STRIP FOR AUTOMOBILES AND THE LIKE
Filed April 7, 1930
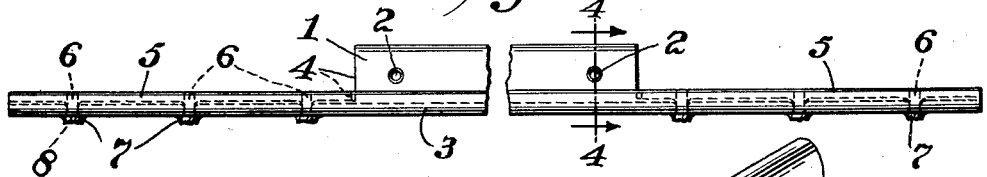
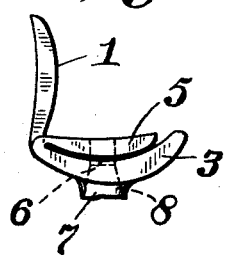
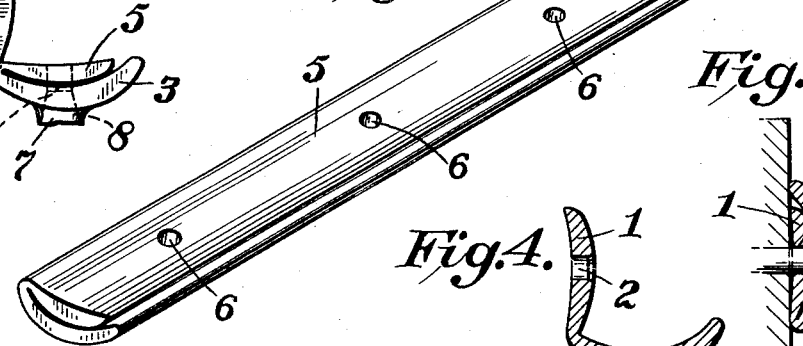
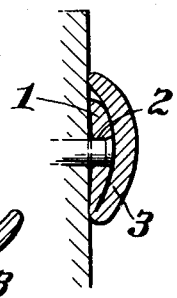
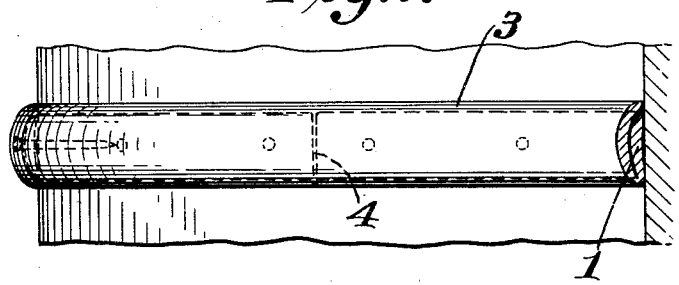
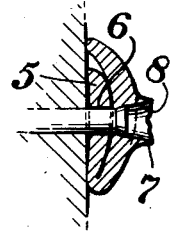
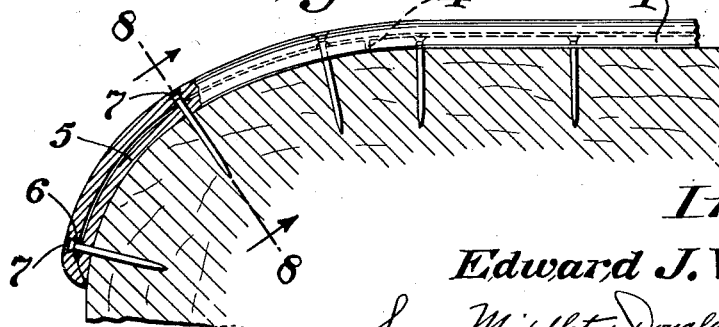
Inventor:
Edward J. Welch,
Spear, Middleton, Donaldson + Hall
Attys.

Patented July 5, 1932

1,865,660

UNITED STATES PATENT OFFICE

EDWARD J. WELCH, OF NEW YORK, N. Y.

FINISHING STRIP FOR AUTOMOBILES AND THE LIKE

Application filed April 7, 1930. Serial No. 442,375.

My present invention relates to improvements in a molding strip, which is made of deformable metal such as aluminum, and the method of making and applying the same.

It initially is of such shape as will permit the application of nails to the base of the strip for securing the same to the automobile body or other surface, and the strip is provided with a flange or cover portion adapted to be displaced from its original position and to be seated with its free edge engaging the surface beyond the edge of the base, and completely covering the base, so as to complete the prescribed finished effect covering the nails and presenting a surface which is unbroken in appearance.

It is particularly adapted to be applied to the automobile body or other surface including a straight surface portion and a curved surface portion. This molding strip is adapted to be applied in one continuous piece to the flat part of the automobile body and to the curved part of the automobile body as at the corners. This presents an unbroken finished molding on the body including a straight and a curved portion.

A molding strip which will accomplish these objects is hereinafter described and claimed together with the method of making and applying the same.

The invention consists in the features, combination and arrangement of parts hereinafter described and particularly pointed out in the claims.

In the drawing showing one embodiment of my invention

Figure 1 is a side elevation of the strip before application to the car.

Fig. 2 is an end view of the strip in the form before application to the automobile body.

Fig. 3 is a perspective view of the end portion of the strip before application to the car.

Fig. 4 is a cross section of the main part of strip before application.

Fig. 5 is a cross section of the main part of the strip in folded condition.

Fig. 6 is a view of the strip partly in section and applied to the body.

Fig. 7 is a front view of Fig. 6.

Fig. 8 is a sectional view of the double layer end portion with the nail in place and the burr ready to be peened over.

In this drawing 1 is the base of the strip which may be perforated at 2 to receive the nails by which the strip is applied to the automobile top.

At one edge of this base flange, a cover flange 3 is located extending initially at about right angles to the base flange. This covering flange is slightly curved in cross section and it is of a width to completely cover the base flange when folded down over the same, and also its width is such that it will extend beyond the free edge of the base flange, substantially enclose said free edge and reach to a plane in which the under face of the base flange lies so that the free edge of the covering flange will bear upon the surface to which the strip is attached.

This contributes to the finished appearance of the strip when applied as there is no crevice visable between the two layers of the strip at the free edges thereof, the appearance being uniform in respect to the two edges.

Before applying the strip I cut the base flange transversely as at 4 and fold this cut section of the base indicated generally at 5 up against the inner face of the corresponding portion of the covering flange. After this is done the two layers are perforated at 6 and a burr 7 is left around the nail hole on the outer surface of the covering strip.

In applying the strip the main portion of the base flange is nailed to the desired surface of the top of the car for which purpose said base section may be provided with nail holes 2 by punching. After this base flange has been attached, the covering flange is folded down onto the base flange to cover the same and hide the nails. In this action the perforated double layer end portions of the strip are brought into a position in which the folded up base portion is restored into the same plane with the main part of the base flange, and both of the layers of this end portion are thus in the same plane with the corresponding main portions of the strip. These end portions are now overlying the rounded corner of the body or top, and they are in position to be shaped to these rounded corners. After being thus shaped, which it will be observed readily can be done by reason of the deformable character of the metal, the double layer end portions are secured to the rounded or curved surfaces of the body or top by means of nails passed through the registering holes and driven into the body. The heads of the nails engage the covering flange within the nail holes, the holes being tapered for this purpose as shown at 8. The burrs 7 are then peened over and filed down to make a smooth uninterrupted surface and to completely close the holes.

The deformable metal is extruded.

The continuous mold strip of the present invention is designed to be applied in one continuous piece to adjoining surfaces lying in different planes with rounded or square corners.

I claim:

1. As an article of manufacture a deformable strip of extruded metal for automobiles and the like comprising a base flange for attachment to the automobile body, a covering flange normally standing at an angle to the base flange initially to permit driving of nails therethrough and foldable over said base flange to cover said nails, and end portions adapted to be bent in relation to the main portion of the strip, said end portions having a section of the base flange initially folded against the covering flange to provide superimposed layers to permit nails to be driven through both layers, substantially as described.

2. A molding strip according to claim 1 in which the end section of the base flange is initially severed from the main portion of said flange.

3. A molding strip according to claim 1 in which the main part of the base flange is provided with nail holes, while the main part of the covering flange is intact, and the end portion of the covering flange together with the folded up end section of the base flange are perforated, substantially as described.

In testimony whereof I affix my signature.

EDWARD J. WELCH.